Patented Nov. 18, 1930

1,781,788

UNITED STATES PATENT OFFICE

WINCENTY MATZKA, OF LONDON, ENGLAND

PROCESS FOR THE PRODUCTION OF A FERMENT

No Drawing. Application filed March 2, 1926, Serial No. 91,854, and in Great Britain April 8, 1925.

The present invention relates to processes for the production of alcoholic liquors by fermentation of the aqueous saccharine extracts from sugar-containing vegetable materials such as fruits, vegetables, or juices or residues therefrom.

One of the objects of the present invention is to produce a fermented extract from vegetable raw material especially fruit material without destruction of the natural aroma. Another object is to prepare distilled alcohol from such extract. Another object is the preparation of ferment cultures suitable for this purpose, especially ferment cultures which suppress or destroy the undesired properties in the extract while leaving the natural aroma undestroyed. A further object is to modify the natural properties of the ferments by cultivation so as to render them suitable for this purpose. An important feature of the invention is the after-treatment of the ferment culture. Other features of the invention will be apparent from the following description and the appended claims.

By the process of the present invention fruit or vegetable material containing sugar, is treated to yield an aqueous saccharine extract and this extract is then fermented by the aid of an alcohol-producing ferment which has been propagated in a body of aqueous liquor of the same nature and which will not destroy the natural aroma of the raw material. It is preferable to allow the fermentation to proceed with the maintenance of a slight acidity e. g. in the case of fruits, to maintain a degree of acidity in the liquor corresponding to that in the fruit. Regulated quantities of sugar are preferably added during fermentation and such added sugar is preferably of the same nature as that found in the raw material and thus characteristic of such raw material.

The most suitable raw material is fruits such as lemons, oranges, grape-fruit, citrus, pineapple and the like or their residues. By residues is meant, for example, the fruit which is rejected during the manufacture of fruit preserves i. e. undersized fruit, abnormal fruit, or cuttings of small size left over in slicing the fruit for canning.

The fruits or vegetables or their residues are first subjected to suitable chemical, catalytic or fermentative treatment for the conversion of any starch into sugar and/or are disintegrated mechanically; water may be added if desired; the water-soluble extract is then removed by filter, pressing, centrifuging or like processes. The process may be carried out with heating if this does not injure the aromatic constituents.

The weak extract sometimes contains suspended bodies such as proteins and these may be separated out by coagulation or precipitation in known manner.

The composition of the liquor is then adjusted with respect to hydrogen ion concentration, sugar content etc. to secure the correct composition for the fermentative process, i. e. a composition approximating to that of the natural fruit juice.

In treating extracts from tea and wild fruits rich in tannin, a suitable addition may be made of gelatine dissolved in 40% alcohol in order to precipitate the tannin matter.

To avoid destruction of the aroma during fermentation, it is necessary carefully to select the ferment which is used. Therefore, I employ ferments which have been cultivated and multiplied upon the material itself, viz. the weak extract, until these ferments no longer attack the pleasant aromatic constituents of the fruit juice. The destruction of the aroma proceeds proportionally with the decrease in nutritive material and on the basis of this discovery, I have succeeded in cultivating the ferment in such manner that it does not destroy the aromatic constituents. In practice, I find that by cultivating an alcohol producing ferment for a sufficiently long time with a portion of weak liquor obtained as in the first part of the process and by adjusting and maintaining the quantity of the nutritive material present, I can obtain good results especially if the ferment is then treated with a solution containing alcohol, glycerine and tartaric acid. It has been found that when an aqueous extract of fruit is subjected to cultures treated in this way, much better results are obtained than if the whole fruit mass is treated.

By distillation, it is possible to obtain alcohol which is free from undesirable constituents and at the same time to preserve the typically fine aroma of the fruit. Such alcohol can be used as a beverage without very long storage.

A further advantage of the new process is that the fermented weak extracts after adjustment of their composition as hereinafter described contain a high percentage of alcohol and they can be distilled and if desired clarified giving a liquid containing an excellent aroma.

The fermented weak extract obtained in the fermentation process is separated from the ferment by filtration, clarified and placed in bottles or barrels or distilled and if desired can be again clarified with or without addition of substances improving the taste in every case.

The separated ferment is tested for purity and if necessary, purified as above described, whereupon it can be again used for inoculation.

The marc or pulp may be used as cattle food if desired after hydrolysis or other chemical treatment.

Example

One ton of pineapple residue is first thoroughly disintegrated mechanically and then warmed to 55° C. It is maintained for half an hour at this temperature and then extracted with water or macerated with water and rapidly pressed, centrifuged, or the like so as to separate a weak water-soluble extract from the water insoluble residue.

The composition of the weak extract depends on the composition of the fruit and varies with the natural fruit acids present therein; the acidity is adjusted to that of the natural fruit either by addition of acids such as tartaric, lactic, phosphoric, citric, etc. or by partial neutralization with alkaline substances such as lime and then the liquor is filtered, if desired after warming to 70° C.; the filtrate is clarified and run into a vat which has been inoculated with the alcoholic ferment after previous cooling to about 28° C. The ferment which gives the best results for treating the weak pineapple extract is obtained from the atmosphere or obtained from a commercial saccharomycetes culture and then multiplied. To this end a small portion of weak extract prepared as above described is treated with 12% of its volume of ethyl alcohol and allowed to stand with its surface open to the atmosphere in a wide open-mouthed vessel. On the other hand a commercial alcoholic ferment culture may be added; the liquid is maintained for several days so with an acid and sugar content about the same as that of the pineapple fruit e. g. by suitable addition of acid and sugar if required. The exact percentage varies with the place of origin of the fruit.

When this portion begins to ferment strongly, alcohol will be formed and water must be added to maintain the percentage of about 12% of alcohol in the liquid; the addition of water may be controlled by a hydrometer or by measurement of the carbon dioxide evolved.

Having prepared the desired quantity of the desired ferment, it is separated from the liquid by filtration, washed with cool water and shaken vigorously for a fairly long time in an aqueous solution containing 12% of ethyl alcohol, 1% tartaric acid and 3% glycerine. This stabilizes the ferment and is instrumental in preserving the natural aroma in the fermentation of the body of liquor.

The ferment is again filtered off and washed on the filter with a 2% aqueous solution of glycerine and then with pure water after which it can be preserved with exclusion of air or used at once for inoculating the weak extract.

The alcohol ferment isolated and obtained in this way can also be dried in vacuo at a low temperature.

The fermentation of the main bulk of the weak extract can now be performed in similar manner but without the addition of ethyl alcohol with regular adjustment of acid content and addition of the quantity of sugar which is typical for the pineapple to maintain the acidity and sugar content the same as in the natural fruit; the process is continued till the percentage of alcohol is twelve.

At this stage the ferment is separated by filtration and washed several times with water by decantation from the mechanical impurities after which it is washed as above described and again used for inoculation.

The juice which has been fermented until it contains 12% alcohol is clarified, e. g. by further filtration and drawn off as such into casks or bottles as a beverage or any desired proportion of the alcohol may be removed by distillation after which the liquor may be again clarified.

The marc and pulp can be dried or heated, e. g. with 5% hydrochloric acid and a little water for two hours in an autoclave at two atmospheres pressure (three atmospheres absolute) after which the acid can be neutralized by caustic soda and the residue dried when it gives a readily digestible cattle food.

It will be seen therefore that the important features of the present invention are the fermentation of the aqueous extract of vegetables or fruits and particularly of residue thereof, together with the employment of ferments which have been cultivated upon portions of the weak extract to be treated and preferably stabilized by the acid alcohol glycerine mixture. A further important feature is the preservation of the aroma by stabilizing the ferment against the aromatic constituents and an additional important feature is the control and adjustment of the percentages of acid and sugar in the weak liquor undergoing fermentation.

I declare that what I claim is:—

1. Process for the production of a ferment for the fermentation of the aqueous saccharine extract from waste vegetable raw material containing sugar which comprises treating said waste vegetable raw material to obtain an aqueous extract, supplying approximately 12% of alcohol to said extract, inoculating said extract with a small quantity of alcohol-producing ferment, and then progressively adding to said extract sugar from another source to propagate said ferment while maintaining sugar concentration characteristic of said vegetable material and alcohol concentration approximately constant.

2. Process for the production of a ferment for the fermentation of the aqueous extract from fruit material containing sugar which comprises treating said fruit material to obtain an aqueous extract, supplying approximately 12% of alcohol to said extract, inoculating said extract with a small quantity of alcohol-producing ferment, and then progressively adding to said extract sugar from another source to propagate said ferment while maintaining sugar concentration characteristic of said fruit material and alcohol concentration approximately constant.

3. Process for the production of a ferment for the fermentation of the aqueous saccharine extract from waste vegetable raw material containing sugar which comprises treating said waste vegetable raw material to obtain an aqueous extract, supplying approximately 12% of alcohol and a small quantity of weak organic acid to said extract, inoculating said extract with a small quantity of alcohol-producing ferment, and then progressively adding to said extract sugar from another source to propagate said ferment while maintaining sugar concentration characteristic of said vegetable material and alcohol concentration approximately constant.

4. Process for the production of a ferment for the fermentation of the aqueous extract from fruit material containing sugar which comprises treating said fruit material to obtain an aqueous extract, supplying approximately 12% of alcohol and a small quantity of weak organic acid to said extract, inoculating said extract with a small quantity of alcohol-producing ferment, and then progressively adding to said extract sugar from another source to propagate said ferment while maintaining sugar concentration characteristic of said fruit material and alcohol concentration approximately constant.

5. Process for the production of a ferment for the fermentation of the aqueous saccharine extract from waste vegetable raw material containing sugar which comprises treating said waste vegetable raw material to obtain an aqueous extract, supplying approximately 12% of alcohol to said extract, inoculating said extract with a small quantity of alcohol-producing ferment, and then progressively adding to said extract sugar from another source to propagate said ferment while maintaining sugar concentration characteristic of said vegetable material and alcohol concentration approximately constant, and separating the ferment so propagated from said aqueous extract and treating it with alcohol, glycerine and weak organic acid.

6. Process for the production of a ferment for the fermentation of the aqueous extract from fruit material containing sugar which comprises treating said fruit material to obtain an aqueous extract, supplying approximately 12% of alcohol to said extract, inoculating said extract with a small quantity of alcohol-producing ferment, and then progressively adding to said extract sugar from another source to propagate said ferment while maintaining sugar concentration characteristic of said fruit material and alcohol concentration approximately constant, and separating the ferment so propagated from said aqueous extract and treating it with alcohol, glycerine and tartaric acid.

7. Process for the production of a ferment for the fermentation of the aqueous saccharine extract from waste vegetable raw material containing sugar which comprises treating said waste vegetable raw material to obtain an aqueous extract, supplying approximately 12% of alcohol to said extract, inoculating said extract with a small quantity of alcohol-producing ferment, and then progressively adding to said extract sugar from another source to propagate said ferment while maintaining sugar concentration characteristic of said vegetable material and alcohol concentration approximately constant, and separating the ferment so propagated from said aqueous extract and treating it with a solution containing about 12% of alcohol, about 1% of tartaric acid, and about 3% of glycerine.

8. Process for the production of a ferment for the fermentation of the aqueous saccharine extract from waste vegetable raw material containing sugar which comprises treating said waste vegetable raw material to obtain an aqueous extract, supplying approximately 12% of alcohol to said extract, inoculating said extract with a small quantity of alcohol-producing ferment, and then progressively adding to said extract sugar from another source to propagate said ferment while maintaining sugar concentration characteristic of said vegetable material and alcohol concentration approximately constant, and separating the ferment so propagated from said aqueous extract and treating it with a solution containing about 12% of alcohol, about 1% of tartaric acid, and about 3% of glycerine, and then washing it with an aqueous solution of glycerine and finally washing it with pure water.

9. Process for the production of a ferment for the fermentation of the aqueous saccharine extract from waste vegetable raw material containing sugar which comprises treating said waste vegetable raw material to obtain an aqueous extract, supplying approximately 12% of alcohol to said extract, inoculating said extract with a small quantity of alcohol-producing ferment, and then progressively adding to said extract sugar from another source to propagate said ferment while maintaining sugar concentration characteristic of said vegetable material and alcohol concentration approximately constant, and stabilizing the ferment so propagated with alcohol, glycerine and a weak organic acid.

In witness whereof, I have hereunto signed my name this 25th day of February 1926.

WINCENTY MATZKA.